Dec. 29, 1964  F. ZIMMER ETAL  3,163,501
PROCESS FOR THE PRODUCTION OF WELDED SEAMS IN NIOBIUM AND
VANADIUM STEELS, AND WELDED JOINTS PRODUCED THEREBY
Filed Oct. 11, 1962
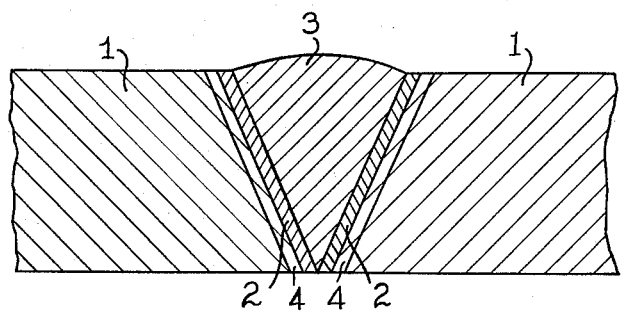
INVENTORS
Francois Zimmer
Guy Faber
BY
Pierce, Scheffler & Parker
Attorneys 3,163,501
PROCESS FOR THE PRODUCTION OF WELDED SEAMS IN NIOBIUM AND VANADIUM STEELS, AND WELDED JOINTS PRODUCED THEREBY
Francois Zimmer, Uccle, Belgium, and Guy Faber, Rieden, Switzerland, assignors to Aktiengesellschaft, Brown, Boveri & Cie., Baden, Switzerland, a joint-stock company, and to Bureau d'Etudes Industrielles Fernand Courtoy, Societe Anonyme, Brussels, Belgium, a joint-stock company
Filed Oct. 11, 1962, Ser. No. 229,922
Claims priority, application Switzerland Oct. 13, 1961
6 Claims. (Cl. 29—196.1)

This invention relates to a process for the production of welded seams for the purpose of connecting thick-walled austenitic niobium steel or ferritic vanadium steel, where the surfaces adjacent to the welded seam are built-up prior to the welding operation by a layer of niobium or vanadium free weld material for the purpose of avoiding the formation of cracks at the welding edges, and to the welded joint made by said process.

It is a known fact that austenitic niobium steel as well as ferritic vanadium steel have the tendency to develop cracks at the welding edges during the annealing process following the welding operation. These cracks develop at the outer zone of the base material immediately adjacent to the seam and can cause damage if the structural members are subject to high stresses. The tendency to develop cracks will arise only if the material is subjected to great heat during the welding operation and cooled off rapidly, a condition which exists always within a zone adjacent to a welded seam.

If this outer zone is subjected to heat after the conclusion of the welding operation in order to eliminate the stresses it will become brittle temporarily as tests have shown while the niobium or vanadium carbides are being precipitated. If severe stresses are present, such as will occur for example in case of a welding operation and subsequent cooling, the material will deform gradually until the stresses are eliminated. If the degree of such deformation exceeds the ductility of the material cracks will develop within its outer zone.

If the zone adjacent to a welded seam is annealed its ductility increases as soon as all carbides are precipitated and if the annealing process is then continued there will be no further danger of the formation of cracks.

For this reason the proposal had been made to apply, in cases of poorly weldable niobium and vanadium steels, a layer of niobium or vanadium free weld material to the surfaces adjacent to the welded seam prior to the welding operation. This built-up welding will generate only minor shrinking stresses. The separate parts are then annealed. No cracks will develop due to the low stresses present. The welded seam is then formed.

The intermediate annealing step which eliminates the embrittlement of the zone adjacent to the seam is necessary because the quantity of heat furnished by the arc during the welding operation is insufficient to influence thermally the zone of the base material subject to the formation of cracks. The metallic parts are good heat conductors. The presently used thickness of the built-up layer causes a substantial difference in temperature within the layer so that the outer zone remains within the critical temperature range of the carbide separation. In spite of the built-up weld there would still be the danger of the formation of cracks and it is for this reason that the intermediate annealing of the entire work pieces at sufficiently high temperatures becomes necessary.

The process of the present invention makes possible a simplification of the above described steps by keeping the built-up layer to a maximum thickness of 2 mm.

The accompanying drawing illustrates one example of a welded joint produced in accordance with this process. The separate parts 1, 1 which are to be welded together are provided with layers 2, 2 of niobium or vanadium free weld material, this material having a maximum thickness of 2 mm. The welded seam 3 can now be formed at the parts prepared in the above described manner. No prior step of intermediate annealing is required. The small thickness of the built-up layer has the effect that the zones which are subject to formation of cracks adjacent to the seam, indicated in the drawing by numeral 4, 4 are heated adequately and rapidly during the course of the regular welding operation producing the seam and any danger of the formation of cracks is definitely avoided.

The permissible thickness of each of the built-up layers 2, 2 will depend on the power of the arc used for the welding of the seam. If the power is great the maximum thickness of 2 mm. can be employed. In case of a lower power of the arc it will be necessary to reduce the thickness of the layer accordingly.

The above described process, when compared with the known methods, has the advantage that the intermediate annealing step is eliminated thereby attaining a saving in time and labor costs and making it possible to utilize the heating means for other purposes.

As in the prior proposal referred to above the so-called built-up weld is formed, in the case of the niobium containing austenitic steel, of an austenitic steel of the same or similar composition but free of niobium and in the case of a vanadium containing ferritic steel, of a steel containing 0.5–1.5% of molybdenum and 0–3.5% of chromium but free of vanadium. An example of a vanadium containing ferritic steel composition is as follows:

| | Percent |
|---|---|
| C | 0.05–0.30 |
| Si | 0.10–1.00 |
| Mn | 0.10–1.00 |
| Cr | 0.00–5.00 |
| Mo | 0.50–1.50 |
| V | 0.15–0.80 |
| Fe | Remainder |

An example of a niobium containing austenitic steel is as follows:

| | Percent |
|---|---|
| C | 0.05–0.20 |
| Si | 0.10–1.00 |
| Mn | 0.10–1.00 |
| Cr | 14.00–20.00 |
| Ni | 8.00–20.00 |
| Mo | 0.00–5.00 |
| Nb | 0.10–1.00 |
| Fe | Remainder |

The built-up welds are formed in the conventional way by hand welding either by arc welding with electrodes or by submerged arc welding. The weld seam also may be formed by either of these known methods. The same materials are used for the weld seams as for the built-up welds.

We claim:
1. Process for the production of a welded seam for the purpose of connecting a thick-walled steel selected from the group consisting of niobium containing austenitic and vanadium containing ferritic steels, where the surfaces adjacent to the welded seam are built-up by layers of weld material free of niobium and vanadium respectively and the weld seam is formed of steel that is free of niobium and vanadium respectively for the purpose of avoiding the formation of cracks at the edges of the seam prior to the welding operation, characterized in that the built-up layers each has a maximum thickness of 2 mm. and that the welding is carried out without intermediate annealing.

2. A welded joint of thick walled steel, selected from the group consisting of niobium containing austenitic and vanadium containing ferritic steels, said joint comprising a built-up layer of material free of niobium and vanadium respectively on the welded face of each steel part, said built-up layer having a maximum thickness of 2 mm. and a weld seam of the same material.

3. Process for the production of a welded seam connecting a thick walled niobium containing austenitic steel which comprises forming built-up layers of niobium free steel on the surfaces to be welded and forming a weld seam of the same steel, said built-up layers each having a thickness not greater than 2 mm.

4. A weld seam consisting of thick walled niobium containing austenitic steel, layers on the welded surfaces of a steel free of niobium and a weld seam of the same steel, said layers each having a thickness not greater than 2 mm.

5. Process for the production of a welded seam connecting a thick walled vanadium containing ferritic steel which comprises forming built-up layers of vanadium free steel on the surfaces to be welded and forming a weld seam of the same steel, said layers each having a thickness not greater than 2 mm.

6. A weld seam consisting of a thick walled vanadium containing ferritic steel, layers on the welded surfaces of a steel free of vanadium and a weld seam of the same steel, said layers each having a thickness less than 2 mm.

References Cited in the file of this patent
UNITED STATES PATENTS

| | | |
|---|---|---|
| 2,156,307 | Rapatz | May 2, 1939 |
| 2,769,227 | Sykes et al. | Nov. 6, 1956 |
| 2,789,048 | Long et al. | Apr. 16, 1957 |
| 2,963,129 | Eberle | Dec. 6, 1960 |